United States Patent
Tontiruttananon et al.

(10) Patent No.: US 7,301,905 B1
(45) Date of Patent: Nov. 27, 2007

(54) OVERLOAD CONTROL SYSTEM AND METHOD FOR A TELECOMMUNICATIONS SYSTEM

(75) Inventors: Channarong Tontiruttananon, Richardson, TX (US); Carlos Molina, Plano, TX (US); Carlos Motta, Richardson, TX (US); Anabella Arosemena, Dallas, TX (US); Kuntaporn Saiyos, Richardson, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 987 days.

(21) Appl. No.: 10/185,522

(22) Filed: Jun. 28, 2002

(51) Int. Cl.
*H04L 12/26* (2006.01)
(52) U.S. Cl. ..................................... 370/232
(58) Field of Classification Search ................ 370/229, 370/230, 232, 235, 241, 252, 253, 230.1, 370/233, 234, 235.1
See application file for complete search history.

(56) References Cited

U.S. PATENT DOCUMENTS

| | | | | |
|---|---|---|---|---|
| 5,463,620 A | * | 10/1995 | Sriram | ........................ 370/412 |
| 5,828,653 A | * | 10/1998 | Goss | ........................... 370/230 |
| 6,879,840 B2 | * | 4/2005 | Razavilar et al. | ........... 455/522 |

OTHER PUBLICATIONS

Ikeda, C.; Suzuki, H., "Adaptive congestion control schemes for ATM LANs," INFOCOM '94. Networking for Global Communications. 13th Proceedings IEEE , vol., No. pp. 829-838 vol. 2, Jun. 12-16, 1994□□.*

Seong-Won Yuk; Jung-Hee Ryu; Kwang-Cheol Lee; Dong-Hu Cho, "Multiclass rate control mechanism for prioritised voice service in packet networks," Electronics Letters , vol. 35, No. 18pp. 1519-1520, Sep. 2, 1999□□.*

Berger, A.W.; Whitt, W., "A multiclass input-regulation throttle," Decision and Control, 1990., Proceedings of the 29th IEEE Conference on , vol., No. pp. 2106-2111 vol. 4, Dec. 5-7, 1990□□.*

Karam, M.J.; Tobagi, F.A., "On traffic types and service classes in the Internet," Global Telecommunications Conference, 2000. GLOBECOM '00. IEEE , vol. 1, No.pp. 548-554 vol. 1, 2000.*

Aurthur W. Berger, "Overload Control Using Rate Control Throttle: Selecting Token Bank Capacity for Rebustness to Arrival Rates", IEEE Transactions on Automatic Control, vol. 36, No. 2, Feb. 1991, pp. 216-219.

* cited by examiner

*Primary Examiner*—Doris H. To
*Assistant Examiner*—Kerri M Rose
(74) *Attorney, Agent, or Firm*—Haynes and Boone, LLP

(57) ABSTRACT

Provided is a system and method for controlling overload in a telecommunications network. The network carries a traffic load that may include traffic of multiple classes and mixed types. The method determines whether the traffic load has exceeded one or more overload thresholds. Each threshold is associated with a class or type of traffic. If one or more of the thresholds have been exceeded, the method sets a timer associated with the exceeded threshold. Each timer has a state (e.g., expired or not expired) and the states of the timers are used to look up a function for controlling the overload. The function is used to alter the traffic flow of one or more of the traffic classes.

15 Claims, 6 Drawing Sheets

OVERLOAD CONTROL SYSTEM AND METHOD FOR A TELECOMMUNICATIONS SYSTEM

CROSS-REFERENCE

This application is related to U.S. patent application Ser. No. 10/184,424, filed on Jun. 28, 2002.

BACKGROUND OF THE INVENTION

The following disclosure relates generally to communications systems and, more particularly, to controlling overload in a telecommunications system.

Telecommunications systems are generally designed to operate at or below a certain traffic capacity. This means that they can successfully service traffic up to that capacity, but the service starts to deteriorate when the capacity is exceeded. When this occurs, the system goes into "overload" and, in some situations, may fail entirely.

One or more overload control measures may be implemented in such telecommunication systems in an attempt to regulate or at least minimize the impact of traffic overload. These control measures generally operate by "throttling" the traffic (e.g., permitting only a portion of the traffic to pass through the system). For example, a percent blocking throttle approach blocks and rejects arriving traffic with a given probability. A call gapping throttle rejects traffic for a certain predefined period of time and then accepts traffic for another predefined period of time (e.g., traffic is allowed through the "gap" that exists when the throttle is open). A token bank throttle uses "tokens" to regulate the traffic by allowing only the traffic with a token to pass through the throttle.

However, none of these control measures adequately address the complexities presented by traffic patterns in telecommunications systems. For example, none of the above control measures is suitable for handling "mixed" traffic that includes multiple types of messages. Likewise, none of the above control measures is suitable for differentiating between classes of service. Traffic is rejected regardless of its class. Furthermore, some of the measures fail because they are unable to compensate for varying overload onset rates. For example, if an overload occurs more rapidly than the control system was designed to handle, the system may fail to control the overload. A further problem is that the previously described control measures are generally designed for a specific overload condition having specific traffic parameters and so are unable to react appropriately when an overload occurs that does not fit within the system's parameters.

Accordingly, what is needed is a system and method for controlling overload that is capable of handling a variety of message types, message classes, and overload onset rates while also being adaptable to handle non-specified overload events.

SUMMARY OF THE INVENTION

In one embodiment, a method for controlling overload in a telecommunications system is provided. The telecommunications system is designed to support a maximum traffic load that includes at least two classes of traffic. Each class of traffic moves at a rate, although the rates of the two classes may be equal. The method determines whether a traffic load exceeds a first threshold, where the first threshold represents overload of the first class of traffic. If the traffic load exceeds the first threshold, the rate associated with the first class of traffic is altered. The method then determines whether the traffic load exceeds a second threshold, where the second threshold represents an overload of the second class of traffic. If the traffic load exceeds the second threshold, the rate associated with the second class of traffic is altered. This enables overloads associated with the first and second classes of traffic to be separately controlled.

Other aspects and features of the present disclosure will become apparent to those ordinarily skilled in the art upon review of the following description of specific embodiments of the disclosure in conjunction with the accompanying figures.

DETAILED DESCRIPTION OF A PREFERRED EMBODIMENT

Figure 1:
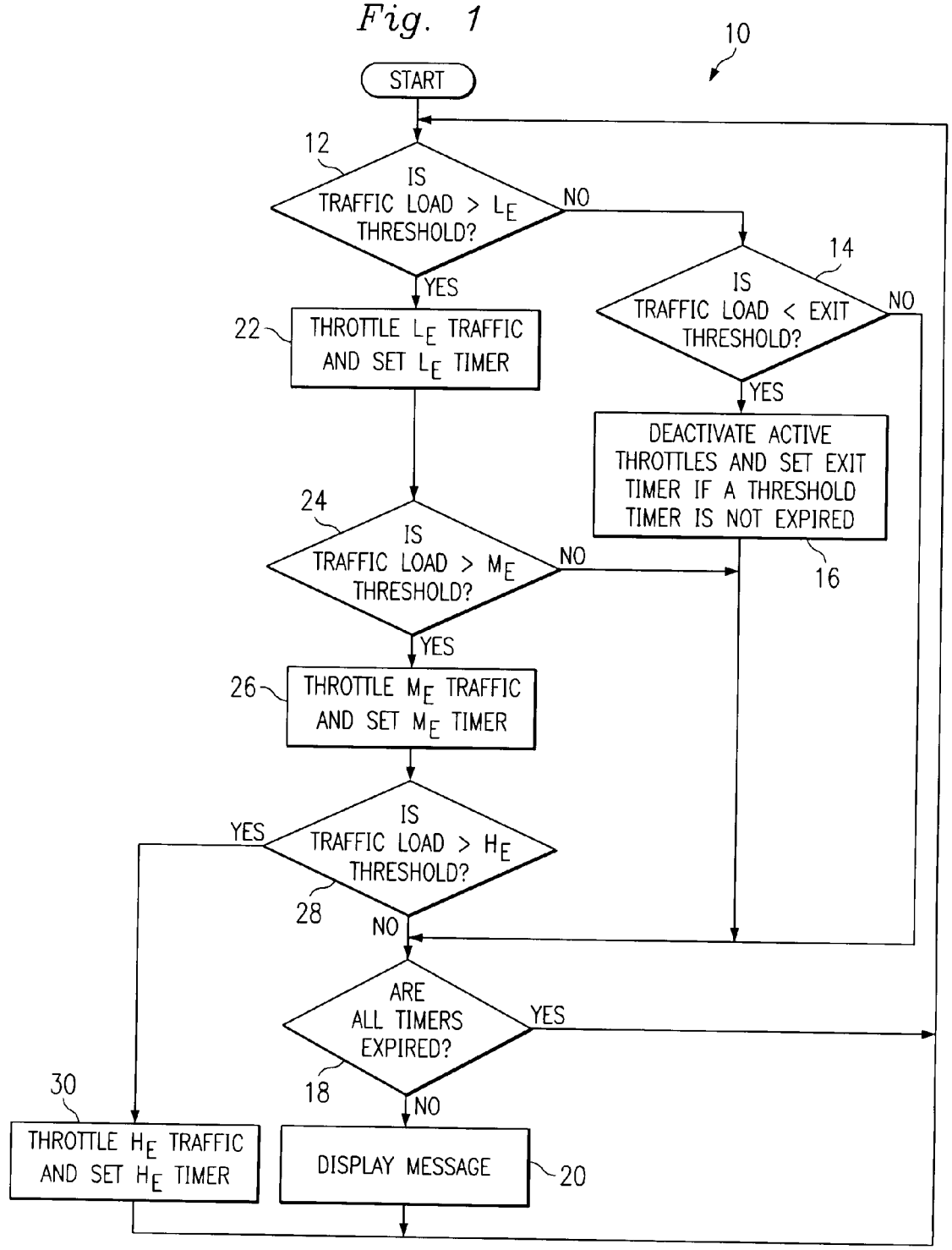
FIG. 1 is a flowchart of a method for selectively controlling overload in a telecommunications system.

The present disclosure relates generally to communications systems and, more particularly, to controlling overload in a telecommunications system. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a method 10 is operable to control overload in a telecommunications system by using a number of steps 12-30 to selectively limit traffic flow. Overload may result when a processor receives more messages than can be serviced for a sustained period of time. When this occurs, the processor may begin to drop packets (in a packetized system) to prevent system failure that may result from unconstrained growth in memory or processing time requirements and corresponding message processing delays.

Accordingly, an overload condition may be detected when a system or system component begins to run out of resources. In a computing environment, these resources may include processing utilization or processor usage, time (e.g., time to process), bandwidth in packets per second (pps) and/or bits per second (bps), and memory (such as buffer space). For example, some techniques for detecting an overload condition and triggering overload control include: queue delay, which measures message queuing delays to determine when a delay in processing a message exceeds throughput requirements; buffer usage, which monitors the growth in the size of one or more buffers that store messages; memory usage, which monitors usage on a computing node that processes messages; central processing unit (CPU) usage, which monitors the average CPU occupancy on a node that processes messages; call processing occupancy, which monitors the portion of the CPU usage that processes call processing related messages; and message rate, which monitors the incoming message rate at a node.

Figure 2:
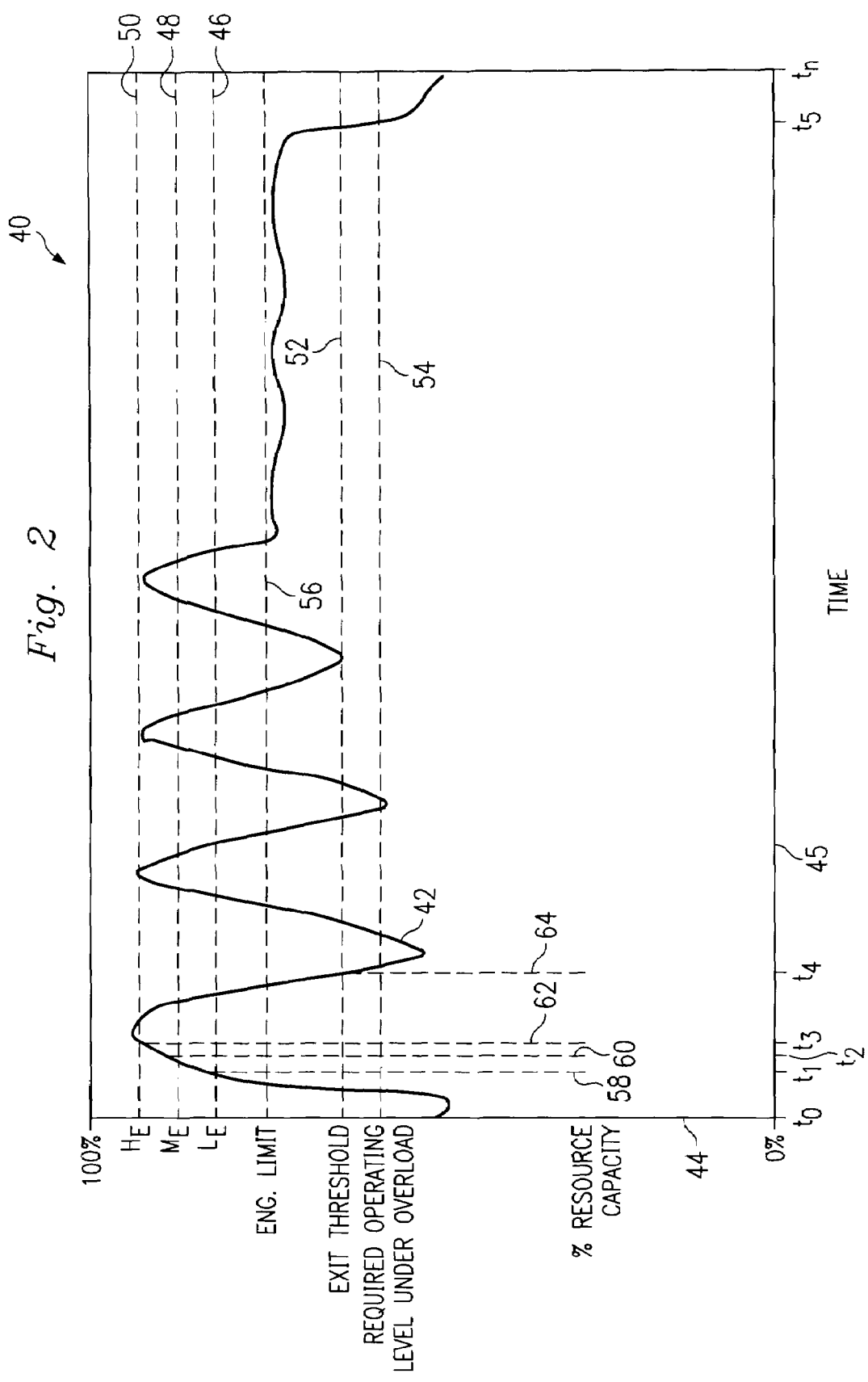
FIG. 2 is a graph illustrating variations of a telecommunications system's resource usage which indicates variations in a traffic load over time with respect to a system capacity.

As will be described later in greater detail using specific examples, the selective limitation may enable overload control of traffic that includes messages of varying types and classes. Furthermore, the selective limitation may occur despite overload onset rates that vary from traffic "ramping up" (e.g., increasing) over relatively long amounts of time (e.g., gradual overload) to relatively short amounts of time (e.g., rapid overload). In addition, the selective limitation may be adaptive and so may automatically adjust for different mixes of traffic loads. The method 10 may be used to control a traffic load as illustrated in FIG. 2. In the present example, the traffic is "packetized" into discrete data packets and divided into three classes, which are low priority, medium priority, and high priority.

Referring now to FIG. 2, a graph 40 illustrates a traffic load 42 with respect to a y-axis representing a percentage of a resource capacity 44 and an x-axis representing time 45. As stated previously, the resource capacity 44 may be associated with such resources as processing or CPU utilization, bandwidth, memory, and/or other system resources. The system includes three entry thresholds 46, 48, 50, and an exit threshold 52. It is noted that there may actually be an exit threshold for each of the entry thresholds 46-50. However, for purposes of clarity in the present example, the exit threshold 52 corresponds to a scenario in which each exit threshold is set at the same processing capacity percentage level as the other exit thresholds.

The entry thresholds 46-50 correspond to levels of system capacity where traffic may be "throttled" (e.g., where only a portion of the traffic is permitted to pass through the system) and the exit threshold 52 corresponds to a level of capacity where the previously activated throttles are shut off. For example, the entry threshold 46 ($L_E$ threshold) may be used to throttle the low priority traffic, so that low level traffic is controlled (blocked or otherwise limited) when the system capacity reaches this level. Likewise, the entry threshold 48 ($M_E$ threshold) may be used to control medium priority traffic, and the entry threshold 50 ($H_E$ threshold) may be used to control high priority traffic. Similarly, the exit threshold 52 may be used to shut off the throttles for the low priority traffic, medium priority traffic, and high priority traffic and allow the traffic to pass unhindered.

An operating level 54, which may be an industry standard, identifies a minimum level of traffic that should be supported by the system during overload. An engineered limit 56 identifies a target operating level for the current system during overload. The engineered limit may be based on experimental data, for example, and provides a level below which the system should operate with a guaranteed level of service. This may include a guaranteed message delay and a loss rate. In the present example, the engineered limit 56 is higher than the operating level 54 and so the system will automatically exceed the operating level 54 by maintaining the overload traffic capacity around the engineered limit 56. In the present example, the resource capacity 44 ranges from 0-100%, the operating level 54 is set at 60%, exit threshold 52 is set at 65%, the engineered limit 56 is set at 75%, and the entry thresholds 46, 48, 50 are set at 80%, 85%, and 90%, respectively.

The system also includes three threshold timers 58, 60, 62, and an exit timer 64, all of which are responsive to certain trigger events. For example, the timer 58 ($L_E$ timer) is triggered when the traffic load 42 crosses the $L_E$ threshold 46 at time $t_1$, the timer 60 ($M_E$ timer) is triggered when the traffic load 42 crosses the $M_E$ threshold 48 at time $t_2$, and the timer 62 ($H_E$ timer) is triggered when the traffic load 42 crosses the $H_E$ threshold 50 at time $t_3$. Each timer 58-62 may expire in a predefined amount of time, such as five minutes.

The exit timer 64 starts whenever one of the timers 58-62 is active (e.g., not expired) and the traffic load 42 is detected to be lower than the exit threshold 52. Accordingly, the exit timer 64 may start at time $t_4$, assuming at least one of the timers 58-62 is active. However, the exit timer 64 may not be started at time $t_5$ if the none of the timers 58-62 are active. As with the timers 58-62, the exit timer 64 may expire in a predefined amount of time, such as five minutes. As will be described later, the timers are operable to prevent oscillation in the system's resource usage during overload.

Referring again to FIG. 1, the method 10 begins in step 12 by determining whether the traffic load 42 has exceeded the $L_E$ threshold 46. If the traffic load 42 does not exceed the $L_E$ threshold 46, the method 10 continues to step 14, where it determines whether the traffic load 42 is lower than the exit threshold 52. In step 16, if the traffic load 42 is below the exit threshold 52, any throttling that is occurring is stopped (e.g., traffic of low, medium, and high priority is allowed to pass freely) and the exit timer 64 is set if one of the timers 58-62 are not expired.

In step 18, a determination is made as to whether all of the timers 58-64 are expired. This step is also executed if it is determined in step 14 that the traffic load 42 is not below the exit threshold 52. If the timers are expired, then either no overload is occurring or the overload is under control and the method 10 returns to step 12. However, if one or more of the timers 58-64 are not expired, the method 10 may continue to step 20. In step 20, a message may be displayed to indicate, for example, that the method 10 is active and the system is automatically controlling any overload. The method 10 then returns to step 12.

If it is determined in step 12 that the traffic load 42 does exceed the $L_E$ threshold 46, the method 10 continues to step 22, where the $L_E$ timer 58 is activated and the low priority traffic is throttled according to a predefined function. For example, the low priority traffic may be reduced by a certain percentage or other control methods may be activated, such as will be described later in greater detail.

The method 10 then continues to step 24, where a determination is made as to whether the traffic load 42 has exceeded the $M_E$ threshold 48. If the traffic load 42 does not exceed the $M_E$ threshold 48, the method 10 continues to step 18 as previously described. If the traffic load 42 does exceed the $M_E$ threshold 48, the $M_E$ timer 60 is activated and the medium priority traffic is throttled according to a predefined function in step 26.

The method 10 then continues to step 28, where a determination is made as to whether the traffic load 42 has exceeded the $H_E$ threshold 50. If the traffic load 42 does not exceed the $H_E$ threshold 50, the method 10 continues to step 18 as previously described. If the traffic load 42 does exceed the $H_E$ threshold 50, the $H_E$ timer 62 is activated and the high priority traffic is throttled to a predefined level in step 26. In this manner, the system may throttle traffic according to predefined priority levels and prioritize the use of available resources.

Figure 3:
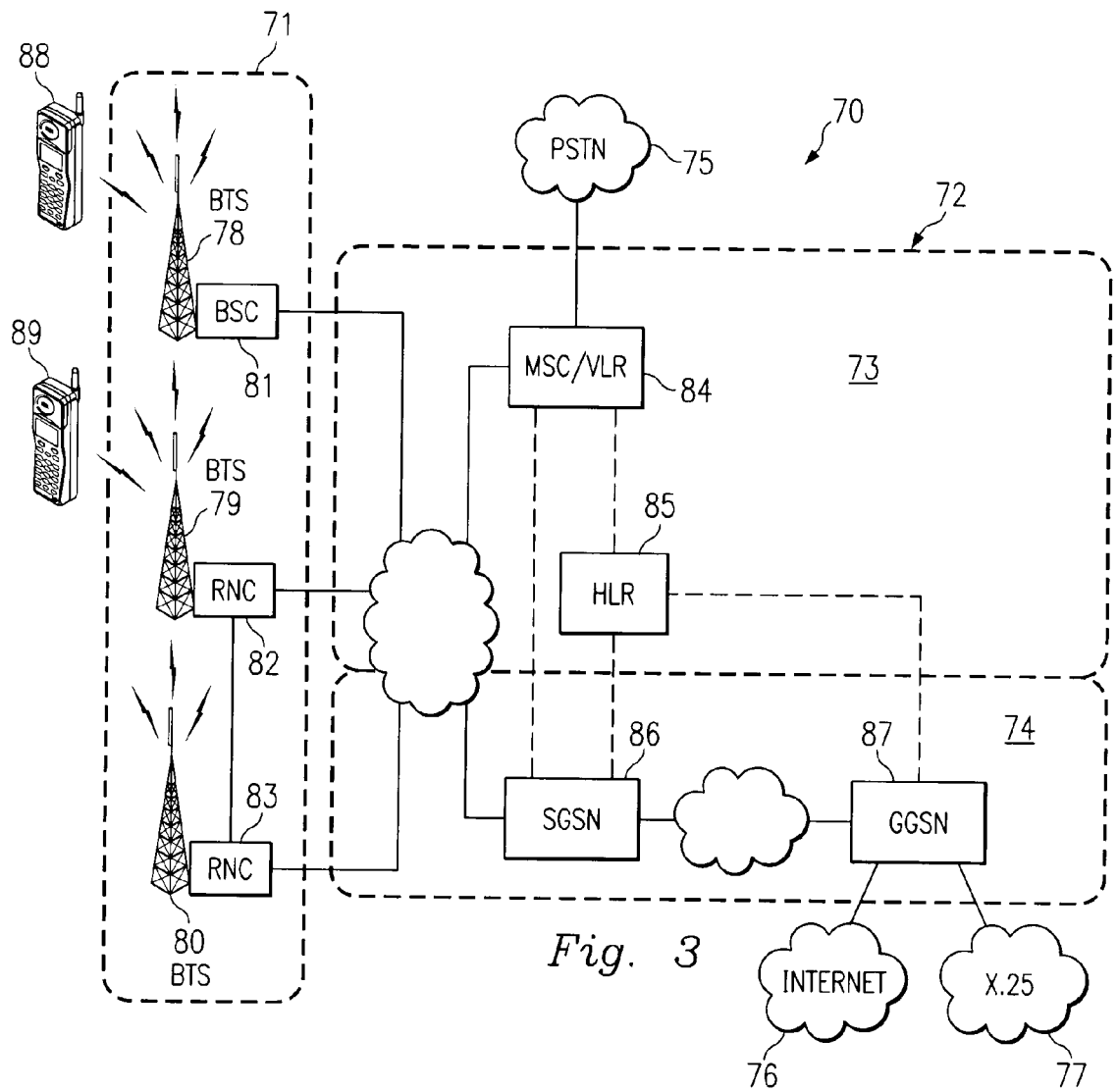
FIG. 3 is a diagram of an exemplary telecommunications network within which overload control may be practiced.

Referring now to FIG. 3, a telecommunications network 70 illustrates a system in which the method described in reference to FIG. 1 may be practiced. In the present example, the network 70 is a wireless network that supports both voice and data packet communications using General Packet Service Radio (GPRS) and Universal Mobile Telecommunications System (UMTS) technologies.

The network 70 comprises a Radio Access Network (RAN) 71 and a core network 72. The core network further comprises a circuit domain 73 and a packet domain 74. Other networks may be accessible to the network 70, such as a Public Switch Telephone Network (PSTN) 75 (connected to the circuit domain 73), Internet 76, and an X.25 network 77 (both connected to the packet domain 74.

The RAN 71 includes a plurality of cells (not shown) serviced by base transceiver stations (BTS) 78, 79, and 80. The BTS 78 is connected to a base station controller (BSC) 81 to provide a second-generation wireless network. The BTSs 79, 80 are accessible to radio network controllers (RNC) 82, 83, respectively, to provide a third-generation wireless network. A mobile switching center/visitor location register (MSC/VLR) 84 may be used to connect the core network 73 with other networks, such as the PSTN 75. A home location register (HLR) 85 may be accessible to the MSC/VLR 84 and also to a serving GPRS support node (SGSN) 86 and a gateway GPRS support node (GGSN) 87 in the packet domain 74.

The network 70 enables at least one mobile device 88 to establish a communication session with another device via the BTS 78. For example, a request to establish a communication session by the mobile device 88 may be directed by the MSC/VLR 84 to (1) a second mobile device 89, (2) a voice terminal (not shown) coupled to the PSTN 75, or (3) a data terminal (not shown) coupled elsewhere to the telecommunications network 70. For example, if the communication session is a circuit data transfer session, the request may be to connect the mobile device 88 to a computer or other data device via the network 70. If the communication is a packet data transfer session, the request may be routed through the SGSN 86, the GGSN 87, and to the Internet 76. It is noted that the mobile devices 88 and 89, while illustrated as mobile telephones, may be any mobile device capable of communicating via the network 70. It is understood that the network 70 is for purposes of illustration and the present disclosure may be equally applicable to other networks.

Figure 4:
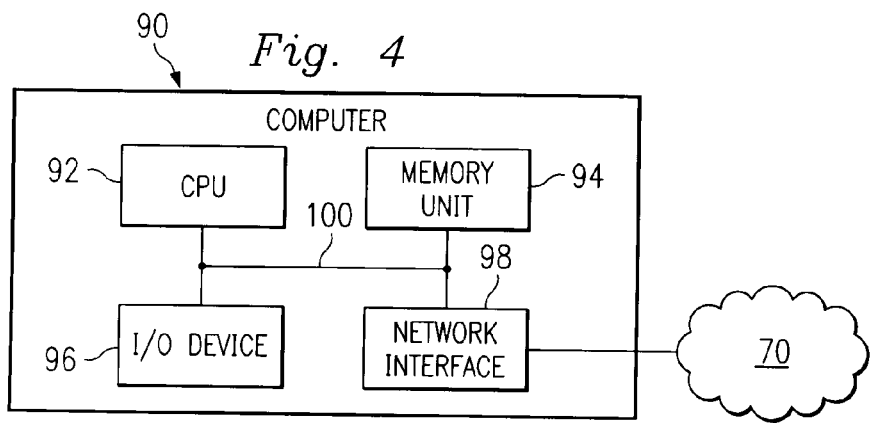
FIG. 4 is a schematic view of a computer that may be used within the network of FIG. 3 to execute the method of FIG. 1.

Referring now to FIG. 4, an exemplary computer 90, such as may be used in the network 70 of FIG. 2, is illustrated. The computer 90 may include a CPU 92, a memory unit 94, an input/output ("I/O") device 96, and a network interface 98. The components 92, 94, 96, and 98 are interconnected by a bus system 100. It is understood that the computer may be differently configured and that each of the listed components may actually represent several different components. For example, the CPU 92 may actually represent a multiprocessor or a distributed processing system; the memory unit 94 may include different levels of cache memory, main memory, hard disks, and remote storage locations; and the I/O device 96 may include monitors, keyboards, and the like.

The computer 90 may be connected to the network 70 via the network interface 98. Because the computer 90 may be connected to the network 70, certain components may, at times, be shared with other computers (not shown). Therefore, a wide range of flexibility is anticipated in the configuration of the computer. Furthermore, it is understood that, in some implementations, the computer 90 may act as a server to other computers. Accordingly, the method 10 of FIG. 1 may be stored and executed solely on the computer 90 or may be divided among multiple computers and accessible via the network 70. In addition, the network 70 may serve as all or part of the bus system 100 and so the various components 92-98 may be distributed through the network 70.

Figure 5:
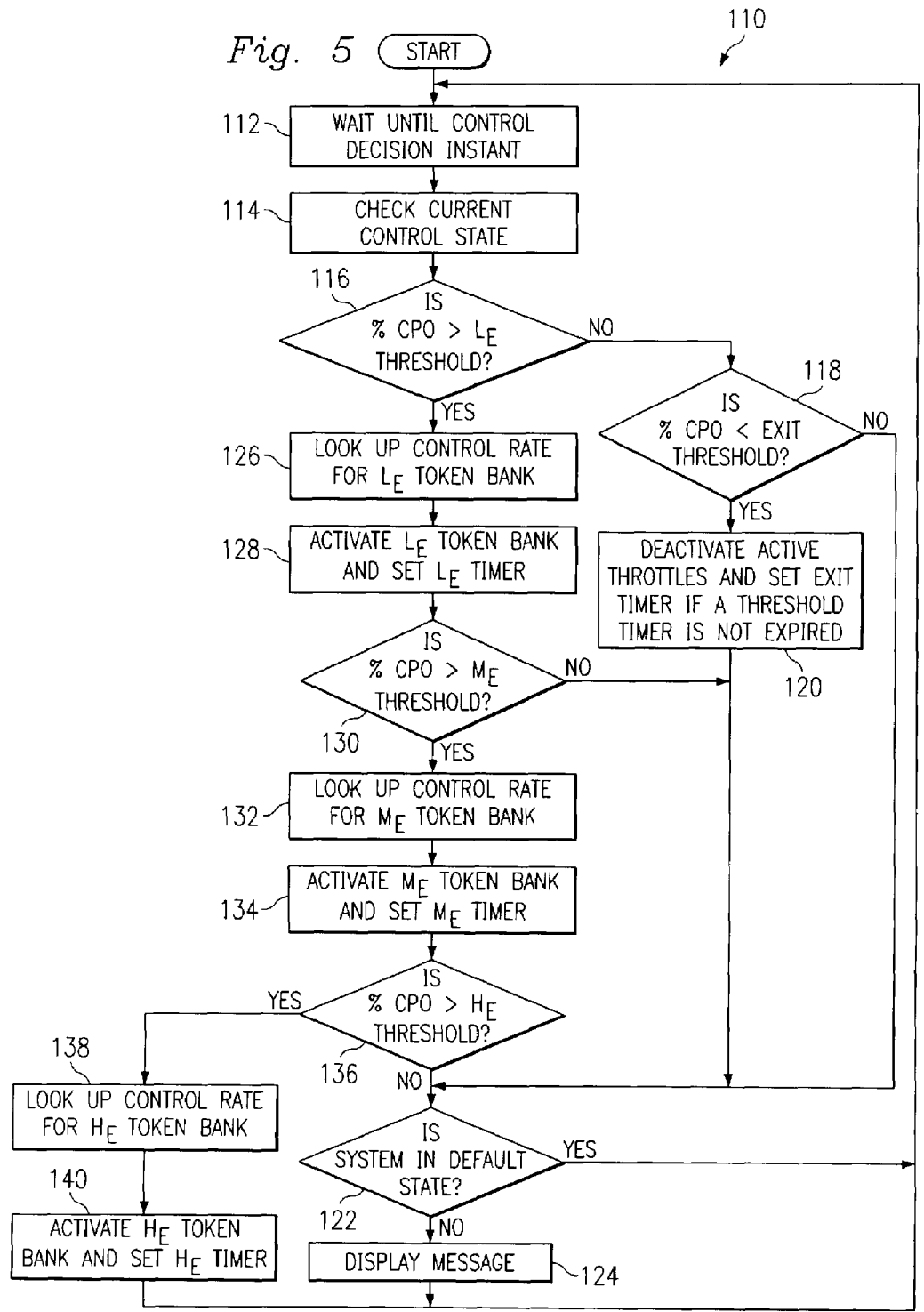
FIG. 5 is a flowchart illustrating a further embodiment of a method for selectively controlling overload in a telecommunications system.
Figure 6:
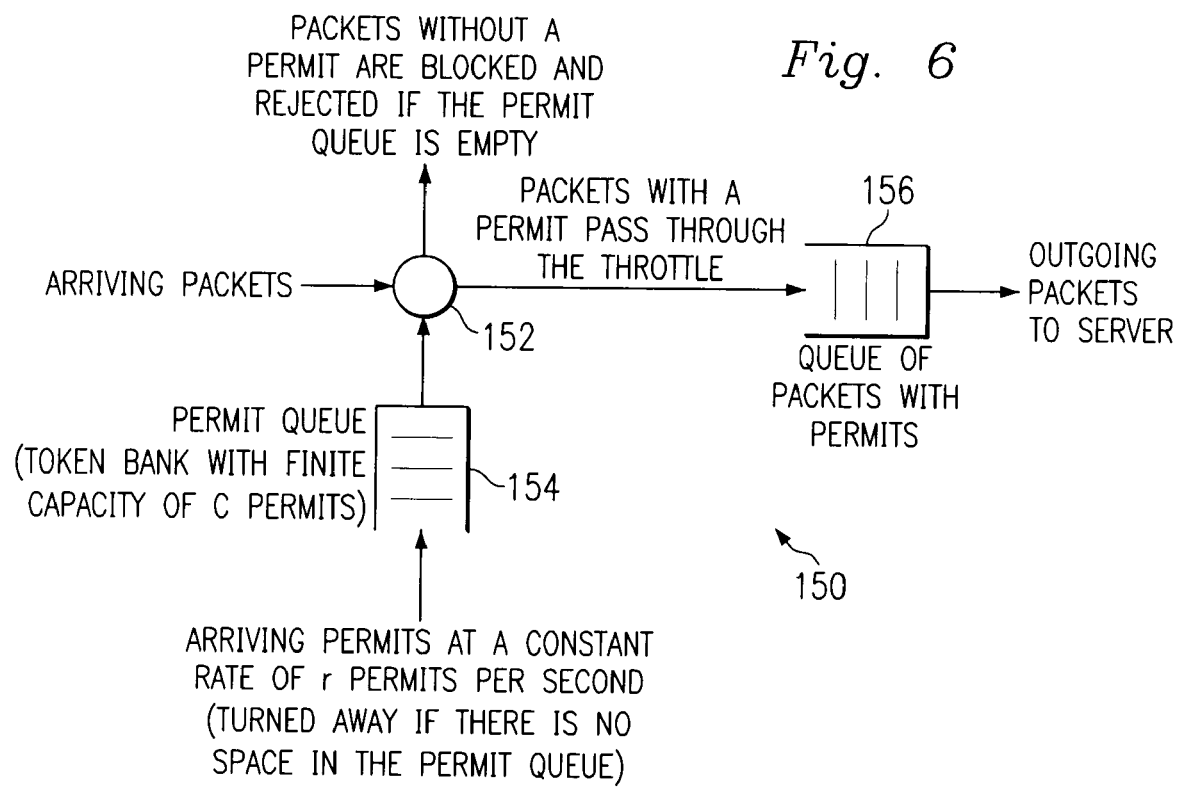
FIG. 6 is a diagram of an exemplary token bank that may be used to implement the method of FIG. 5.

Referring now to FIG. 5, a method 110 is operable to use steps 112-140 to control overload on the network 30 of FIG. 2. The method 10 may be implemented using a token bank control system (as is illustrated in FIG. 6) to control traffic flow and may automatically adapt to changing overload parameters. In the present example, the traffic is "packetized" into discrete data packets.

Referring now to FIG. 6, a token bank control system 150 is operable to control packetized traffic passing through a "throttle" 152. The throttle 152 may be either "open" (e.g., set to allow a packet to pass) or "closed" (e.g., set to prevent a packet from passing). A determination as to whether a packet is allowed to pass through the throttle 152 is based on whether the packet is associated with a token from a token bank 154. Packets that are associated with a token may pass through the throttle 152 and be placed in a packet queue 156 for transmission, while packets having no token may be rejected and dropped as follows.

In the present example, the token bank 154 is a queue that contains a number of tokens up to a defined maximum. As a packet arrives at the throttle 152, the token bank 154 is checked to determine if it is empty. If the token bank 154 is empty, the packet is rejected and discarded. If there is a token in the token bank 154, the packet is permitted to pass through the throttle 152 and the token bank 154 is decremented by one. The token bank 154 may be "refilled" by continuously incrementing the token bank 154 at a predetermined token flow rate that is equal to the number of packets per unit time that are allowed through the throttle 152. For example, if it is desired that a maximum of ten packets per second pass through the throttle 152, then the token bank 154 would be refilled at a uniform rate of ten tokens per second (e.g., one token every 100 milliseconds). If the token bank 154 is full, then tokens above the maximum bank capacity are discarded. In this manner, the maximum passage rate through the throttle 152 can be controlled by altering the maximum number of tokens in the token bank 154 and/or the token flow rate at which the token bank 154 is refilled.

Figure 7:
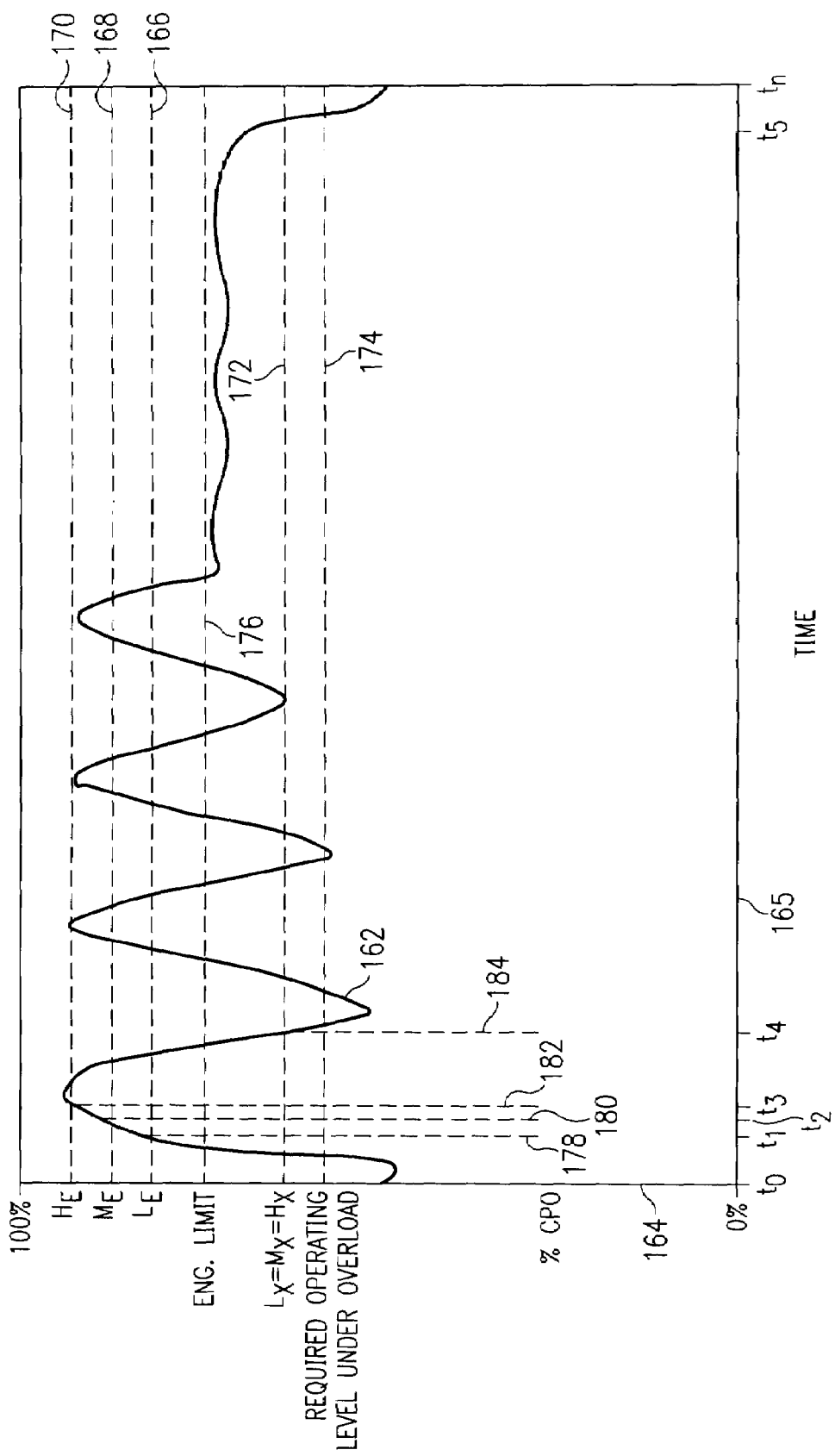
FIG. 7 is a graph illustrating the method of FIG. 5 operating within the system of FIG. 3.

Referring also to FIG. 7, a graph 160 illustrates a traffic load 162 with respect to a y-axis representing a resource capacity 164 of an exemplary telecommunications system and an x-axis representing time. As stated previously, the resource capacity 164 may be associated with such resources as processing utilization, bandwidth, memory, and/or other system resources. In the present example, the resource capacity is a call processing occupancy (CPO). A processing capacity of a processing unit (such as the CPU 90 of FIG. 4) may be divided into a variety of portions associated with specific tasks, such as call processing and non-call processing. Accordingly, the CPO comprises the call processing portion of the processing unit's capacity and so one hundred percent of the CPO may be only a portion of the overall processing capacity of the processing unit.

The system includes three entry thresholds 166, 168, 170, and an exit threshold 172. The entry thresholds 166-170 correspond to levels of system resource usage where traffic may be throttled and the exit threshold 172 corresponds to a level of system resource usage where the previously activated throttles are shut off. For example, the entry threshold 166 ($L_E$ threshold) may be used to throttle the low priority traffic, so that low level traffic is controlled (blocked or otherwise limited) when the system capacity reaches this level. Likewise, the entry threshold 168 ($M_E$ threshold) may be used to control medium priority traffic, and the entry threshold 170 ($H_E$ threshold) may be used to control high priority traffic.

Similarly, the exit threshold 172 may be used to shut off the throttles for the low priority traffic, medium priority traffic, and high priority traffic. It is noted that the exit threshold 172 represents exit thresholds $L_E$, $M_E$, $H_E$ that correspond to the entry thresholds 166-170, respectively. Setting each exit threshold at the same CPO percentage level as the other exit thresholds aids in preventing oscillation among different flow rates, as will be described.

Each of the thresholds 166-170 is associated with a token bank ($L_E$, $M_E$, and $H_E$ token banks, respectively, but not shown) such as was described previously in reference to FIG. 6. Therefore, each priority level of traffic (e.g., low, medium, and high) is associated with its own token bank. This enables selective traffic control by allowing traffic of a particular priority class to be controlled without controlling traffic of other priority classes. The initial settings for each of the token banks may conform to predefined parameters. For example, an maximum number of tokens and an initial token flow rate may be assigned to each of the $L_E$, $M_E$, and $H_E$ token banks according to experimentally selected optimal traffic levels. These initial settings may serve as a reference call model to which the system may default when operating under no overload.

An operating level 174, which may be an industry standard, identifies a minimum level of traffic that should be supported by the system during overload. An engineered limit 176 identifies a target operating level for the current system during overload. In the present example, the engineered limit 176 is higher than the operating level 174 and so the system will automatically exceed the operating level 174 by maintaining the overload traffic capacity around the engineered limit 176. In the present example, the CPO 164 ranges from 0-100%, the operating level 174 is set at 60%, exit threshold 172 is set at 65%, the engineered limit 176 is set at 75%, and the entry thresholds 166, 168, 170 are set at 80%, 85%, and 90%, respectively.

The system also includes three token bank timers 178, 180, 182, and an exit timer 184, all of which are responsive to certain trigger events. For example, the timer 178 ($L_E$ timer) is triggered when the traffic load 162 crosses the $L_E$ threshold 166 at time $t_1$, the timer 180 ($M_E$ timer) is triggered when the traffic load 162 crosses the $M_E$ threshold 168 at time $t_2$, and the timer 182 ($H_E$ timer) is triggered when the traffic load 162 crosses the $H_E$ threshold 170 at time $t_3$. Each timer 178-182 may expire in a predefined amount of time, such as five minutes.

The exit timer 184 starts whenever one of the timers 178-182 is active (e.g., not expired) and the traffic load 162 is detected to be below the exit threshold 172. Accordingly, the exit timer 184 may start at time $t_4$, assuming at least one of the timers 178-182 is active. However, the exit timer 184 may not be started at time $t_5$ if the none of the timers 178-182 are active. As with the timers 178-182, the exit timer 184 may expire in a predefined amount of time, such as five minutes.

Referring again to FIG. 5, the method 110 continues to step 112 and waits for a control decision instant that may be associated with a resource usage sampling interval. The sampling interval should be small enough to enable accurate measurement of variations in the traffic load 162, but not so small that excessive resources are consumed by the sampling.

In the present example, the control decision instant of step 112 is based on sampling instances of the traffic load 162 with a moving average estimator that uses a pre-calculated smoothing window of length W sampling intervals. An instantaneous mean value at a decision time t may be estimated using an equation such as:

$$\hat{X}_t = \frac{1}{W} \sum_{i=0}^{W-1} X_{t-i} \qquad \text{Eq. 1}$$

In Equation 1, a larger W results in less fluctuation in the estimated mean, but generally takes longer to detect changes in the traffic load 162. A smaller W yields an estimate that more closely tracks changes in the traffic load 162, but may trigger overload control when no overload is occurring due to either an increase in resource consumption caused by sampling or a spurious high resource usage having a short duration. This may result in oscillation as the system unnecessarily blocks traffic.

Accordingly, the control decision instant of step 112 may coincide with some sampling instances. The time between control decision instances may be larger than the sampling interval, but should be smaller than W to allow a sufficient response time when overload occurs.

Once the control decision instant occurs, the method 110 continues to step 114, where a current control state is identified as follows. A state table (Table 1) associates a number of control states A-H with the $L_E$ timer 178, the $M_E$ timer 180, the $H_E$ timer 182, and the exit timer 184.

TABLE 1

| Control State | $L_E$ timer | $M_E$ timer | $H_E$ timer | Exit timer | Comments (traffic for which token rate should be increased) |
|---|---|---|---|---|---|
| A | Not expired | Expired | Expired | Not expired | Low Priority |
| B | Expired | Not expired | Expired | Not expired | Medium Priority |
| C | Not expired | Not expired | Expired | Not expired | Medium Priority |
| D | Expired | Expired | Not expired | Not expired | High Priority |
| E | Expired | Not expired | Not expired | Not expired | High Priority |
| F | Not expired | Not expired | Not expired | Not expired | High Priority |
| G | Not expired | Expired | Not expired | Not expired | High Priority |
| H (Default State) | Expired | Expired | Expired | Expired | Conform to reference call model |

The state table treats the timers 178-184 as either expired or unexpired to determine the current control state. For example, if the $L_E$ timer 178 and the exit timer 184 are not expired, but the $M_E$ 180 timer and the $H_E$ timer 182 are expired, the system is in state A. Accordingly, as noted in the comments column of the state table, the token flow rate of the $L_E$ token bank should be increased to enable a greater flow of low priority traffic. When all of the timers are expired, the system is in a default state H, which conforms to the reference call model described previously.

Once the current control state has been identified, a determination is made in step 116 as to whether the traffic load 162 has exceeded the $L_E$ threshold 166. If the traffic load 162 does not exceed the $L_E$ threshold 166, the method 110 continues to step 118, where it determines whether the traffic load 162 is lower than the exit threshold 172. In step 120, if the traffic load 162 is below the exit threshold 172, any throttling that is occurring is stopped (e.g., traffic of low, medium, and high priority is allowed to pass freely) and the exit timer 184 is set if one or more of the timers 178-182 are not expired.

The method 110 then continues to step 122, where a determination is made as to whether the system is in the default state H where all of the timers 178-184 are expired. This step is also executed if it is determined in step 118 that the traffic load 162 is not below the exit threshold 172. If the timers are expired, then either no overload is occurring or the overload is under control. More specifically, if steps 120, 122, and 112 were executed in succession, then there is no overload. If steps 118, 122, and 112 were executed in that order, then there is an overload but it is under control. However, if step 122 was executed directly before step 124, then there is an overload and self-adjusting steps are being executed to bring the overload under control.

If the timers are expired, the method 110 returns to step 112. However, if one or more of the timers 178-184 are not expired, the method 110 continues to step 124. In step 124, a message may be displayed to indicate, for example, that the method 110 is being executed and the system is automatically controlling overload. The method 110 then returns to step 112.

If it is determined in step 116 that the traffic load 162 does exceed the $L_E$ threshold 166, the method 110 continues to step 126, where a control rate associated with the current control state is selected from a rate table (Table 3). The rate table includes parameters for a low priority class throughput rate $r_L$, a medium priority class throughput rate $r_M$, and a high priority class throughput rate $r_H$. These rates enable the system to associate the current control state with various throttling functions that regulate which of the $L_E$, $M_E$, and $H_E$ token banks are to be throttled and how much throttling should occur. The functions utilize three variables a, b, and c that represent the throughput, corresponding to $(L_E-L_X)$ % CPO, in packets per second (pps) of the low, medium, and high priority traffic, respectively, according to Table 2.

TABLE 2

| Service Group | % CPO | Throughput (pps) |
| --- | --- | --- |
| Low priority | $\text{Min}(L_E-L_X, M_E-M_X, H_E-H_X) = L_E-L_X$ | a |
| Medium priority | $\text{Min}(L_E-L_X, M_E-M_X, H_E-H_X) = L_E-L_X$ | b |
| High priority | $\text{Min}(L_E-L_X, M_E-M_X, H_E-H_X) = L_E-L_X$ | c |

For example, referring specifically to Table 3, if the system is in state A and $r_M$ is greater than or equal to 0.5*b (where b is defined in Table 2), then $r_L$ is increased by 0.5*a, $r_M$ is decreased by 0.5*b, and $r_H$ remains the same. However, if $r_M$ is less than 0.5*b, then $r_L$ is increased by 0.2*a, $r_M$ remains the same, and $r_H$ is decreased by 0.2*c.

The simultaneous increasing of one rate while decreasing another aids in maintaining the overall throughput of the system at the engineered limit. The downward adjustment in one rate may or may not impact the traffic at the associated priority level, but such an adjustment prepares the system for the event where the threshold associated with the decreased traffic level is exceeded by the traffic load. Similarly, functions are defined for each state except the default state H, which reflects the reference call model as previously described with rates $r_L=r_{L0}$, $r_M=r_{M0}$, and $r_H=r_{H0}$, where $r_{L0}$, $r_{M0}$, and $r_{H0}$ are the default rates.

TABLE 3

| State | Token Bank Permit Arrival Rate Setting (pps) | Service Group that the Token Control Rate is Increased |
| --- | --- | --- |
| A | if $r_M \geq 0.5b$, $r_L = r_L + 0.5a$, $r_M = r_M - 0.5b$, $r_H = r_H$<br>if $r_M < 0.4b$, $r_L = r_L + 0.2a$, $r_M = r_M$, $r_H = r_H - 0.2c$ | Low Priority |
| B | if $r_L \geq 0.5a$, $r_L = r_L + 0.5a$, $r_M = r_{M+0.5b}$, $r_H = r_H$<br>if $r_L < 0.5a$, $r_L = r_L$, $r_M = r_{M-rM} + 0.2b$, $r_H = rH - 0.2c$ | Medium Priority |
| C | if $r_L \geq 0.5a$, $r_L = r_L - 0.5a$, $r_M = r_M + 0.5b$, $r_H = r_H$<br>if $r_L < 0.5a$, $r_L = r_L$, $r_M = r_M + 0.2b$, $r_H = r_H + 0.2c$ | Medium Priority |
| D | if $r_L \geq 0.5a$, $r_L = r_L - 0.5a$, $r_M = r_M$, $r_H = r_H + 0.5c$<br>if $r_L < 0.5a$, $r_L = r_L$, $r_M = r_M - 0.2b$, $r_H = r_H + 0.2c$ | High Priority |
| E | if $r_L \geq 0.5a$, $r_L = r_L - 0.5a$, $r_M = r_M$, $r_H = r_H + 0.5c$<br>if $r_L < 0.5a$, $r_L = r_L$, $r_M = r_M - 0.2b$, $r_H = r_H + 0.2c$ | High Priority |
| F | if $r_L \geq 0.5a$, $r_L = r_L - 0.5a$, $r_M = r_M$, $r_H = r_H + 0.5c$<br>if $r_L < 0.5a$, $r_L = r_L$, $r_M = r_M - 0.2b$, $r_H = r_H + 0.2c$ | High Priority |
| G | if $r_L \geq 0.5a$, $r_L = r_L - 0.5a$, $r_M = r_M$, $r_H = r_H + 0.5c$<br>if $r_L < 0.5a$, $r_L = r_L$, $r_M = r_{M-0.2b}$, $r_H = r_H + 0.2c$ | High Priority |
| H | $r_L = r_{L0}$, $r_M = r_{M0}$, $r_H = r_{H0}$ | Conform to Ref. Call Model: No need to adjust the rates |

Referring again to FIG. 5, after the control rate for the $L_E$ token bank is identified for the current state, the $L_E$ token bank is activated using the identified control rate and the $L_E$ timer is set.

The method 110 then continues to step 130, where a determination is made as to whether the traffic load 162 has exceeded the $M_E$ threshold 168. If the traffic load 162 does not exceed the $M_E$ threshold 168, the method 110 continues to step 122 as previously described. If the traffic load 162 does exceed the $M_E$ threshold 168, the method 110 continues to step 132, where a control rate associated with the current control state is selected from the rate table for the $M_E$ token bank. Once the control rate is selected, the $M_E$ token bank is activated with the selected control rate and the $M_E$ timer is set in step 134.

The method 110 then continues to step 136, where a determination is made as to whether the traffic load 162 has exceeded the $H_E$ threshold 170. If the traffic load 162 does not exceed the $H_E$ threshold 170, the method 110 continues to step 122 as previously described. If the traffic load 162 does exceed the $H_E$ threshold 170, the method 110 continues to step 138, where a control rate associated with the current control state is selected from the rate table for the $H_E$ token bank. Once the control rate is selected, the $H_E$ token bank is activated with the selected control rate and the $H_E$ timer is set in step 134. The method 110 then returns to step 112 and waits for the next control instant.

Accordingly, the method 110 may be utilized to adaptively control traffic overload in a telecommunications system. The described overload control enables overloading to be controlled by priority class.

In another embodiment, an overload control method may be based on monitoring a total CPU capacity rather than on monitoring the CPO capacity as previously described. Generally, using total CPU monitoring may present difficulties because non-call processing tasks may cause the processing capacity of the CPU to exceed the overload thresholds when there is no traffic overload. However, due to the additional processing time required to process call tasks during overload, a time differential between non-call processing tasks may increase. Accordingly, the time differential may be used to determine whether an overload is occurring as follows.

A threshold may be set to account for the time differential. If the time differential is below the threshold, then the system is not undergoing overload even if a large portion of the CPU capacity is in use. Therefore, any applicable traffic throttles may be disabled and the traffic may be allowed to pass normally. However, if the time differential is above the threshold, then the system is undergoing overload and overload control methods may be applied as previously described.

In still another embodiment, a non-selective overload control method may be implemented. For example, if selectively discarding traffic by class is not desired, then the method may be implemented without timers and/or without means to adjust token bank flow rates. The method may activate a token bank (set at a predetermined token flow rate) associated with a threshold as the applicable threshold is exceeded.

In the present example, assuming that there are three token banks, the flow rate of the token bank associated with a lowest entry level may be tied to a best call model (e.g., a call model having the highest throughput rate). Similarly, the flow rate of the token bank associated with a middle entry level may be tied to a reference call model, and the flow rate of the token bank associated with a highest entry level may be tied to a worst call model (e.g., a call model having the lowest throughput rate).

While the preceding description shows and describes one or more embodiments, it will be understood by those skilled in the art that various changes in form and detail may be made therein without departing from the spirit and scope of the present disclosure. For example, it is within the scope of the present disclosure that the BTS, the BSC, the MSC, the SGSN, the GGSN and/or the mobile device may not exist in the same fashion in other technologies or implementations, but the same functionality may be achieved using other components. In addition, other methods of obtaining or calculating factors such as predictive control rate adjustment based on one-step or multi-steps ahead resource usage level prediction may be utilized in developing a desired solution. Therefore, the claims should be interpreted in a broad manner, consistent with the present disclosure.

What is claimed is:

1. A method for controlling overload in a telecommunications system having a maximum traffic load handling capability, wherein the traffic load includes at least first and second classes of traffic moving at first and second rates, respectively, the method comprising:
determining whether the traffic load exceeds a first threshold, wherein the first threshold represents an overload of the first class of traffic;
altering at least the first rate if the traffic load exceeds the first threshold;
determining whether the traffic load exceeds a second threshold, wherein the second threshold represents an overload of the second class of traffic;
altering at least the second rate if the traffic load exceeds the second threshold, so that overload occurring to the first and second classes of traffic can be separately controlled;
setting a first timer if the traffic load exceeds the first threshold; and
setting a second timer if the traffic load exceeds the second threshold, wherein the first and second timers are operable to prevent the system from oscillating between an overload state and a non-overload state;
wherein the first and second traffic classes further comprise mixed traffic types.

2. The method of claim 1 further comprising setting a third timer if the traffic load moves below a third threshold after having exceeded the first or second thresholds, wherein the third threshold represents the non-overload state and the third timer is operable to aid the first and second timers in preventing the system from oscillating between the overload state and the non-overload state.

3. The method of claim 1 further comprising:
determining a first and second state of the first and second timers, respectively;
comparing the first and second states to a plurality of first and second state combinations to identify a combination matching the first and second states, wherein each combination is associated with at least one function for altering the first or second rate; and
selecting the function associated with the identified combination, so that the alteration of the first and second rates can be controlled in a predefined manner.

4. The method of claim 3 wherein each of the first and second states is either expired or not expired.

5. The method of claim 1 wherein the traffic load is measured as a percentage of processing capacity, and wherein the first and second thresholds are defined in terms of the processing capacity.

6. The method of claim 1 wherein altering the first and second rates includes altering a token flow rate into at least one token bank.

7. A method for controlling overload in a telecommunications system having a maximum throughput, the method comprising:
identifying a control state associated with a traffic load;
determining whether the traffic load has crossed a first threshold, wherein the first threshold identifies an overload occurrence;
selecting a first control rate based on the control state if the first threshold has been crossed;
adjusting a first traffic flow using the first control rate, wherein the first traffic flow is associated with the first threshold;
activating a first threshold timer when the traffic load crosses the first threshold; and
activating a first exit timer when the traffic load crosses below a first exit threshold, wherein the first threshold timer and the first exit timer are operable to prevent oscillation of the traffic flow.

8. The method of claim 7 further comprising selecting a second control rate based on the control state; and
adjusting a second traffic flow using the second control rate.

9. The method of claim 8 wherein the second traffic flow is adjusted to offset the adjustment of the first traffic flow, so that the maximum throughput of the system is substantially maintained.

10. The method of claim 9 further comprising:

determining whether the traffic load has crossed a second threshold;

selecting a third control rate based on the control state if the second threshold has been crossed; and adjusting at least one of the first and second traffic flows using the third control rate.

11. The method of claim 10 further comprising:

activating a second threshold timer when the traffic load crosses the second threshold; and activating a second exit timer when the traffic load crosses below a second exit threshold, wherein the second threshold timer and the second exit timer are operable to prevent oscillation of the traffic flow.

12. The method of claim 11 wherein the first and second exit thresholds are equal.

13. The method of claim 8 wherein the traffic load is measured as a percentage of processing capacity, and wherein the first threshold is defined in terms of the processing capacity.

14. A system for controlling overload in a telecommunications network having a maximum traffic throughput rate, the system comprising:

a processing means accessible to the network, the processing means having a processing capacity for processing call traffic; and a memory for storing computer executable instructions for processing by the processing means, the instructions for:

determining whether the processing capacity has exceeded a first threshold;

selecting a first rate control function if the processing capacity has exceeded the first threshold;

altering a first traffic rate using the selected first rate control function;

determining whether the processing capacity has exceeded a second threshold;

selecting a second rate control function if the processing capacity has exceeded the second threshold; and altering a second traffic rate using the selected second rate control function;

setting a first timer if the processing capacity exceeds the first threshold;

setting a second timer if the processing capacity exceeds the second threshold; and setting a third timer when the processing capacity drops below the first and second thresholds, wherein the first, second, and third timers are operable to prevent oscillation in the first and second traffic rates;

wherein altering the first traffic rate includes altering a first token bank rate.

15. The system of claim 14 wherein altering the second traffic rate includes altering a second token bank rate.

* * * * *